US010423293B2

(12) United States Patent
Hook et al.

(10) Patent No.: US 10,423,293 B2
(45) Date of Patent: Sep. 24, 2019

(54) CONTROLLING CURSOR MOTION

(71) Applicant: International Business Machines Corporation, Armonk, NY (US)

(72) Inventors: James K. Hook, Eastleigh (GB); Hamish C. Hunt, Middlesex (GB); Nicholas K. Lincoln, Middle Wallop (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 973 days.

(21) Appl. No.: 14/952,793

(22) Filed: Nov. 25, 2015

(65) Prior Publication Data
US 2017/0147179 A1   May 25, 2017

(51) Int. Cl.
*G06F 3/0481* (2013.01)
*G06F 3/0484* (2013.01)

(52) U.S. Cl.
CPC ...... *G06F 3/04812* (2013.01); *G06F 3/04842* (2013.01)

(58) Field of Classification Search
CPC .................................................. G06F 3/04812
See application file for complete search history.

(56) References Cited

U.S. PATENT DOCUMENTS

| | | | | |
|---|---|---|---|---|
| 5,298,890 A * | 3/1994 | Kanamaru | .......... | G06F 3/04842 345/157 |
| 5,508,717 A * | 4/1996 | Miller | ..................... | G06F 3/038 345/157 |
| 5,825,308 A * | 10/1998 | Rosenberg | ............. | G05G 9/047 341/20 |
| 5,929,840 A * | 7/1999 | Brewer | ............... | G06F 3/04812 345/157 |
| 6,005,573 A * | 12/1999 | Beyda | ................... | G06F 3/0485 715/212 |
| 6,091,395 A * | 7/2000 | DeStefano | ............ | G06F 3/0481 715/788 |
| 6,137,472 A * | 10/2000 | Pekelney | ............ | G06F 3/04892 715/858 |

(Continued)

OTHER PUBLICATIONS

Mir, Nov. 13, 2012, "Stop Mouse Cursor From Slipping to Secondary Monitor in Windows 8," https://www.addictivetips.com/windows-tips/stop-mouse-cursor-from-slipping-to-secondary-monitor-in-windows-8/.*

(Continued)

*Primary Examiner* — Ryan Barrett
(74) *Attorney, Agent, or Firm* — Anthony V. S. England; Nicholas Bowman

(57) ABSTRACT

The present invention relates to controlling at least a motion of a cursor relative to at least two graphically-displayed windows on at least a computer monitor, each window comprising at least a respective interaction area and each respective interaction area comprising at least an interaction point, wherein at least a distance between at least two interaction points is measured, each interaction point being in a respective interaction area of one of the windows. At least an active dynamic margin is provided to each of the respective interaction areas in response to any value up to a predetermined, interaction threshold value being measured between their interaction points.

14 Claims, 4 Drawing Sheets

(56) References Cited

U.S. PATENT DOCUMENTS

| | | | | |
|---|---|---|---|---|
| 6,222,554 B1* | 4/2001 | Berry | ............... | A63F 13/10 |
| | | | | 345/427 |
| 6,295,049 B1* | 9/2001 | Minner | ............... | G06F 3/04842 |
| | | | | 345/157 |
| 6,466,199 B2* | 10/2002 | Takase | ............... | G06F 3/038 |
| | | | | 345/157 |
| 6,559,873 B1* | 5/2003 | Dawkins | ............... | G06F 3/04812 |
| | | | | 715/856 |
| 6,664,989 B1* | 12/2003 | Snyder | ............... | G06F 3/038 |
| | | | | 715/856 |
| 6,867,790 B1* | 3/2005 | Brooks | ............... | G06F 3/04812 |
| | | | | 345/157 |
| 9,069,434 B1* | 6/2015 | Kuscher | ............... | G06F 3/0481 |
| 9,081,479 B1* | 7/2015 | Fram | ............... | G06F 3/0236 |
| 2002/0003528 A1* | 1/2002 | Rosenberg | ............... | G06F 3/016 |
| | | | | 345/157 |
| 2002/0171690 A1* | 11/2002 | Fox | ............... | G06F 3/04812 |
| | | | | 715/862 |
| 2006/0033716 A1* | 2/2006 | Rosenberg | ............... | G06F 3/016 |
| | | | | 345/163 |
| 2006/0055670 A1* | 3/2006 | Castrucci | ............... | G06F 3/0481 |
| | | | | 345/157 |
| 2009/0125850 A1* | 5/2009 | Karstens | ............... | G06F 3/0481 |
| | | | | 715/866 |
| 2009/0249257 A1* | 10/2009 | Bove | ............... | G06F 3/04812 |
| | | | | 715/858 |
| 2009/0327886 A1* | 12/2009 | Whytock | ............... | G06F 3/0421 |
| | | | | 715/702 |
| 2011/0119636 A1* | 5/2011 | Ragusa | ............... | G06F 3/03543 |
| | | | | 715/856 |
| 2012/0124515 A1* | 5/2012 | Li | ............... | G06F 3/0482 |
| | | | | 715/808 |
| 2013/0179781 A1* | 7/2013 | Nan | ............... | G06F 3/0482 |
| | | | | 715/711 |
| 2013/0179835 A1* | 7/2013 | Moon | ............... | G06F 3/0482 |
| | | | | 715/810 |
| 2014/0195969 A1* | 7/2014 | Irvine | ............... | G06F 3/038 |
| | | | | 715/810 |
| 2014/0223280 A1* | 8/2014 | Choudhury | ............... | G06F 3/0485 |
| | | | | 715/234 |
| 2014/0229891 A1* | 8/2014 | O'Byrne | ............... | G06F 9/451 |
| | | | | 715/790 |
| 2015/0035753 A1* | 2/2015 | Bystrov | ............... | G06F 3/03543 |
| | | | | 345/163 |
| 2015/0220242 A1* | 8/2015 | Guest | ............... | G06F 3/0354 |
| | | | | 715/740 |
| 2016/0224127 A1* | 8/2016 | Zhou | ............... | G06F 3/038 |

OTHER PUBLICATIONS

Warwagon, Apr. 11, 2013, "How to lock your mouse inside a game on a dual monitor setup," https://www.neowin.net/forum/topic/1146484-how-to-lock-your-mouse-inside-a-game-on-a-dual-monitor-setup/.*

Raymond, "5 Software to Prevent Program from Closing by Disabling the Close Button," Aug. 26, 2012, https://www.raymond.cc/blog/prevent-program-closing-disabling-close-button/.

Steven Sinofsky, "Enhancing Windows 8 for multiple monitors," May 21, 2012, http://blogs.msdn.com/b/b8/archive/2012/05/21/enhancing-windows-8-for-multiple-monitors.aspx.

Randy Cotter, "Dual Monitor Game Fix (no accidental minimizing)," Apr. 19, 2012, YouTube video https://www.youtube.com/watch?v=RpYD0CNuK3o.

\* cited by examiner

CONTROLLING CURSOR MOTION

BACKGROUND

The present invention provides a computer-implemented method, system and a computer program product for controlling a motion of a cursor relative to graphically-displayed windows on a computer monitor.

It is quite common for a user to desire the display of multiple windows on a computer monitor. In this regard, it could be that the user is involved in performing a certain task on a given window and wishes to either use the information displayed on another window or return to another window to complete/start another task.

SUMMARY

According to an embodiment of a method aspect of the present invention, there is provided a computer-implemented method for controlling at least a motion of a cursor relative to at least two graphically-displayed windows on at least a computer monitor, each window comprising at least a respective interaction area and each respective interaction area comprising at least an interaction point, comprising: measuring at least a distance between at least two interaction points, each interaction point being in a respective interaction area of one of the windows, and providing at least an active dynamic margin to each of the respective interaction areas in response to any value up to a predetermined, interaction threshold value being measured between their interaction points.

Other embodiments of the invention are disclosed and claimed, including a computer system implementation and a computer program product.

BRIEF DESCRIPTION OF THE DRAWINGS

Reference will now be made, by way of example, to the accompanying drawings, in which.

DETAILED DESCRIPTION

Figure 1A:
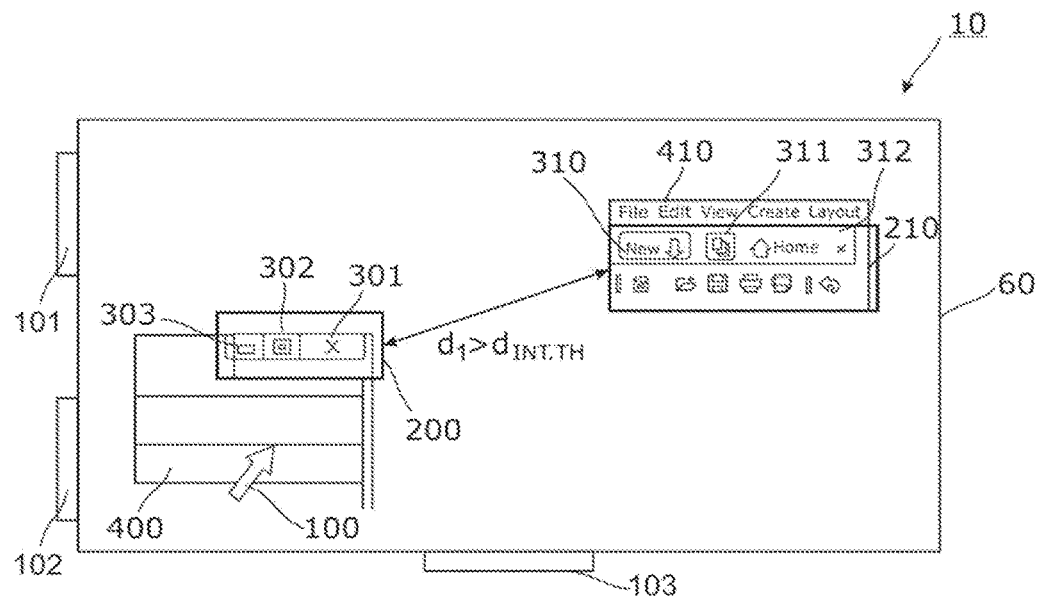
FIGS. 1a and 1b illustrate a principle of operation of an embodiment of the present invention.

If displayed windows are in relatively close proximity, it is quite common when moving a cursor among windows that the cursor overshoots an intended icon of a window and instead inadvertently interacts with a wrong icon in that window or in another window. For example, it could be that a user intends to return to a given browser/window on completion of a certain task but, instead, the user accidentally closes that window or indeed another window relatively closely-spaced thereto. This is, of course, undesirable, being ineffective both in terms of time and resources. Technology is herein disclosed for controlling a motion of a cursor relative to graphically displayed windows on a computer monitor. The disclosed technology is adaptable with a change in window dynamics, may be performed with increased user control and accuracy, and does not rely on the use of redundant and/or unnecessary mechanisms.

An embodiment of the present invention is concerned with controlling a motion of a cursor relative to windows displayed on a computer monitor, particularly between respective interaction areas of relatively-closed spaced windows. An embodiment of the present invention is particularly concerned with reducing the occurrence of inadvertent and/or unintended interactions of the cursor with interaction points in two relatively-closed spaced interaction areas. This is done by providing active dynamic margins to each of the interaction areas, which may be used to control the cursor motion within a given interaction area and/or form the basis of an informed move of the cursor to the other interaction area. This feature may facilitate that the cursor motion between the interaction areas is more controllable in an embodiment of the present invention compared to previously-proposed methods. Thus, events of inadvertent/unintended cursor interaction with interaction points in any one of those interaction areas may be reduced compared to what is possible with previously-proposed methods. The active dynamic margins are provided to each of the interaction areas on the basis of an interaction threshold value, which is predetermined and reflects a distance between the interaction areas at or below which there is an increased possibility of the occurrence of an interaction of the cursor with an interaction point in either one of those respective interaction areas. This feature may impart the advantages of increased accuracy and efficiency of controlling the cursor motion to an embodiment of the present invention. The active dynamic margins are provided on the basis of it being determined that a spacing between the interaction points of two relatively-closely spaced interaction areas is such that there an increased possibility of the cursor interacting with either one of those interaction points. By contrast to previously-proposed methods, they do not take up active display space and/or processing capability as they are not applied unwarranted to the interaction areas and there are no redundant margins/mechanisms in place for controlling the cursor motion.

Preferably, an embodiment of the present invention comprises activating a visibility of the active dynamic margins provided to the respective interaction areas. That the visibility of the active dynamic margins provided to the respective interaction areas may be activated extends the advantage of increased versatility to an embodiment of the present invention. This feature may be used to assist the user in how to move the cursor between the interaction areas and so also imparts the advantages of increased control and accuracy to how cursor motion may be performed. Because the active dynamic margins' visibility may be activated in response to certain conditions, processing capability may be conserved in an embodiment of the present invention.

Desirably, an embodiment of the present invention comprises controlling the cursor motion relative to the respective interaction areas using the provided active dynamic margins for guidance. The active dynamic margins provided to the interaction areas may be used to guide the user in how to move the cursor relative to the interaction areas. For example, the cursor may be retained within a territory of one of the interaction areas or forced through to the other interaction area in an informed manner. So, this feature may contribute to further improving the accuracy of controlling cursor motion compared to previously-proposed methods.

Preferably, in an embodiment of the present invention, the active dynamic margin is provided substantially around the respective interaction area of a given window. The respective interaction area of a given window comprises one or more interaction points that the cursor may interact with by clicking on, for example, an icon representing a given interaction point. In an embodiment of the present invention, active dynamic margins are provided around relatively closely spaced interaction areas and, so may be seen to, mark those interaction areas that pose an increased possibility of inadvertent/unintended interactions of the cursor with interaction points in either one of those interaction areas. Thus, this feature may be seen to further improve on the accuracy and/or control with which cursor motion may be performed in an embodiment of the present invention.

Even more preferably, in an embodiment of the present invention, the active dynamic margin is provided as at least a corner guard applied to a boundary of the respective interaction area. This feature is based on there being an increased possibility of the cursor interacting with the interaction points that substantially populate a given corner of each of the interaction areas. Thus, active dynamic margins are provided to such corners, being implemented as corner guards in a preferred embodiment of the present invention. This feature may provide the advantages of reduced inadvertent/unintended cursor motion and increased user-control to an embodiment of the present invention.

Desirably, an embodiment of the present invention comprises selecting each of the respective interaction areas to comprise at least a modifiable set of interaction points. The interaction area of a given window typically comprises more than one interaction point corresponding to a given function or application. By defining a given set of interaction points in each of the interaction areas, interaction of the cursor with interaction points corresponding to specific functions may be better-controlled. By ignoring the interaction points not falling within the ambit of such a given set, the processing capability of an embodiment of the present invention may be used more prudently and better conserved.

Desirably, in an embodiment of the present invention, measurement of the distance between the two interaction points is repeated, and, in response to the distance between them being measured as more than the interaction threshold value, the active dynamic margins provided to each of the respective interaction areas corresponding to those interaction points are deactivated. This feature may account for any changes in window position with time. Specifically, when two neighbouring interaction areas are no longer so closely spaced to each other such that an inadvertent/unintended interaction of the cursor could occur with interaction points in those areas. Thus, this feature further enforces the increased accuracy and efficiency with which cursor motion may be performed in an embodiment of the present invention, even with the passage of time. Furthermore, by deactivating the active dynamic margins, the processing capability may be conserved and utilised more efficiently.

Preferably, an embodiment of the present invention further comprises: measuring a cursor distance from at least one of the active dynamic margins provided to the respective interaction areas, comparing the measured cursor distance to a predetermined, cursor threshold value, and, activating a visibility of the active dynamic margins in response to the measured cursor distance being recorded as any value up to the cursor threshold value. With this feature, the user is able to make more informed decisions on how to move the cursor between relatively-closely spaced respective interaction areas that have been provided with active dynamic margins.

According to an embodiment of a further aspect of the present invention, there is provided a system for controlling at least a motion of a cursor relative to at least two graphically-displayed windows on at least a computer monitor, each window comprising at least a respective interaction area and each respective interaction area comprising at least an interaction point, comprising: a memory configurable to store executable instructions; a data processor operatively coupled to the memory, the data processor being configurable to execute the instructions stored in the memory, thereby to: measure at least a distance between at least two interaction points, each interaction point being in a respective interaction area of one of the windows, and provide at least an active dynamic margin to each of the respective interaction areas in response to any value up to a predetermined, interaction threshold value being measured between their interaction points. All the advantages of any one of the features of an embodiment of the method aspect of the present invention are also imparted to an embodiment of the system aspect.

According to an embodiment of a further aspect of the present invention, there is provided a computer program product for controlling at least a motion of a cursor relative to at least two graphically-displayed windows on at least a computer monitor, each window comprising at least a respective interaction area and each respective interaction area comprising at least an interaction point, the computer program product comprising a computer-readable storage medium having program instructions embodied therewith, the program instructions executable by a computer to perform operations comprising: measuring at least a distance between at least two interaction points, each interaction point being in a respective interaction area of one of the windows, and providing at least an active dynamic margin to each of the respective interaction areas in response to any value up to a predetermined, interaction threshold value being measured between their interaction points. All the advantages of any one of the features of an embodiment of the method aspect of the present invention are also imparted to an embodiment of the computer program aspect.

The present invention has been described purely by way of example and modifications of detail may be made within the scope of the invention.

Each feature disclosed in the description and, where appropriate, the claims and drawings may be provided independently or in any appropriate combination.

Within the description, the same reference numerals or signs are used to denote the same parts or the like.

In FIGS. 1a to 2b, a system aspect 10 according to an embodiment of the present invention is shown comprising: a memory 101 that is configurable to store executable instructions, and a data processing system 102 that is operatively coupled to the memory 101 and configurable to execute the instructions stored in the memory 101. The system aspect 10 may also generally comprise at least a user-accessible, input interface element 103 that may be used by the user to compile instructions for storage in the memory 101 and to facilitate user communication with the data processing system 102, thereby to cause the data processing system 102 to execute specific instructions stored in the memory 101. The memory 101, the data processing system 102 and the user input interface element 103 are operatively coupled to a computer monitor 60. In an embodiment of the present invention, the instructions that are stored in the memory 101, when executed by the data processing system 102, facilitate controlling a motion of a cursor 100 relative to multiple windows 400, 410 that are graphically displayed on a graphical user interface via the computer monitor 60. The computer monitor may take the form of any screen of a computer, mobile device, tablet computer or wearable having a graphical user interface.

Turning to FIG. 1a, and by way of example, if a user is concerned with performing a task on one of the windows 400, then it is desirable to control and/or prevent travel of the cursor 100 to the other window 410, particularly when, because of a relatively close distance between the two windows 400, 410 there is an increased likelihood of an undesirable interaction of the cursor 100 with the other window 410. Such an undesirable interaction may be an alteration of a status of either one of the windows 400, 410, for example, one of them being inadvertently closed, and so preventing continued performance of a task and/or the performance of another undesired task, for example, running an application on the neighbouring window 410 even when this was not intended. Within the context of an embodiment of the present invention, a window 400, 410 whose continued display on the computer monitor 60 is desired by the user is hereinafter referred to as an active window.

Each window 400, 410 may be defined in terms of its corresponding or so-called respective interaction area 200, 210. The respective interactions areas 200, 210 of the windows 400, 410 each comprise one or more interaction points 301, 302, 303, 310, 311, 312 representing different operational functions and/or applications. Each interaction point 301, 302, 303, 310, 311, 312 is represented by an icon, which, when clicked upon with the cursor 100, allows the operation of a given application/function by the user. In an embodiment of the present invention, the respective interaction areas 200, 210 are those regions of the windows 400, 410 that are substantially populated by interaction points 301, 302, 303, 310, 311, 312 as described hereinabove, such a region being typically found at, but not being limited to, a given boundary of any one of the windows 400, 410 as can be clearly seen from FIG. 1a.

Generally, in an embodiment of the present invention, a knowledge of: window/icon boundaries for all interaction points 301, 302, 303, 310, 311, 312 on all active windows 400, 410; the locations of all interaction points 301, 302, 303, 310, 311, 312 on all active windows 400, 410 and the applications and/or operational functions corresponding thereto, and window orientations and locations so that cursor traversal between monitors 60 can be ascertained, is generated using the data processing system 102. Different methods may be used to determine where the interaction points 301, 302, 303, 310, 311, 312 are located in a given window 400, 410 and the applications/operational functions corresponding thereto. These include, but are not limited, to the use of: screen reader technology, simulated cursor clicks in conjunction with cursor position coordinates, image recognition and/or edge detection technology. This information may be supplemented with additional information such as window size and locations of each and/or specific applications in a given window 400, 410.

Figure 1B:
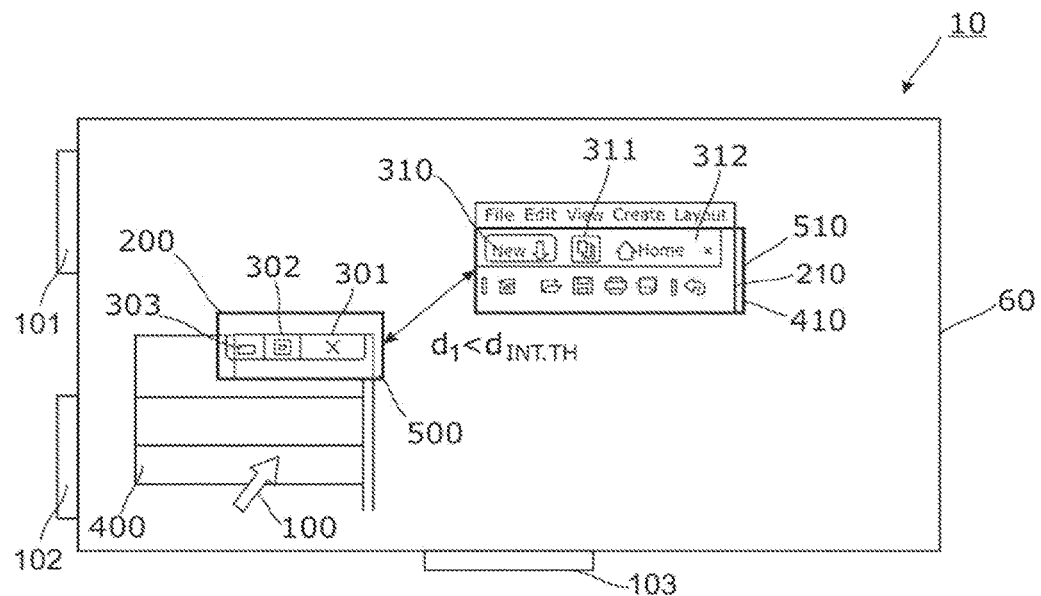

Turning to FIGS. 1a and 1b, two active windows 400, 410 are depicted as displayed on a computer monitor 60. Each of the active windows 400, 410 have respective interaction areas 200, 210 that are each mapped in terms of interaction points 301, 302, 303, 310, 311, 312 as hereinbefore described. An interaction threshold value dINT.TH is defined reflecting a distance between the respective interaction areas 200, 210, at or below which there is an increased possibility of the occurrence of an interaction, which may be undesired/inadvertent, of the cursor 100 with an interaction point 301, 302, 303, 310, 311, 312 in either one of those respective interaction areas 200, 210.

A distance d1 is measured between the respective interaction areas 200, 210, specifically between any two given interaction points 301, 302, 303, 310, 311, 312 thereof. In response to the distance d1 being measured as a value above the predetermined interaction threshold value dINT.TH, no action is taken. This scenario is shown in FIG. 1a.

In response to the distance d1 being measured as a value up to the predetermined, interaction threshold value dINT.TH, an active dynamic margin 500, 510 is provided to each of the respective interaction areas 200, 210 involved in such a measurement. This scenario is depicted in FIG. 1b. A visibility of each of the active dynamic margins 500, 510 is activated so that the motion of the cursor 100 can be controlled relative to such respective interaction areas 200, 210 using the active dynamic margins 500, 510 as guidance tools. In the example of FIG. 1b, the cursor 100 may be retained in window 400 by, for example, implementing a mechanism for blocking its movement outside the window 400 and it may be navigated within a safe territory marked by the visible active margin 500. Alternatively, the cursor 100 may be moved to window 410 by the user forcing it through active dynamic margin 500. In this way, the cursor motion is better controlled and so its involvement in undesired interactions may also be substantially reduced. Each active dynamic margin 500, 510 is provided substantially around the respective interaction area 200, 210 of a given window 400, 410.

The active dynamic margin 500, 510 may also be provided as a corner guard 501, 511 applied to all points 301, 302, 303 of a boundary of a given window 400 whose distance from interaction points 310, 311, 312 in a neighbouring window 410 is any value up to the interaction threshold value dINT.TH. Within the scope of an embodiment of the present invention, an active dynamic margin 500, 501, 510, 511 is a margin that may have an "on" or an "off" state, which is in an active state, that is, having been applied to relatively closely-spaced respective areas 200, 210 of given windows 400, 410 as described hereinabove. In this regard, and by using, for example, configuration settings that may be accessible via the data processing system 102, the user may set certain constraints on the dynamic margins 500, 501, 510, 511 in an embodiment of the present invention. The aforementioned has all been described with reference to FIGS. 2A and 2B.

It is desirable to improve the efficiency with which it can be determined whether there are two given interaction points 301, 302, 303, 310, 311, 312, each of which is in a different window 400, 410, that have a distance d1 between them that is less than or equal to the interaction threshold value dINT.TH. This may be done by using an algorithm for analysing each set of interaction points 301, 302, 303 in a window 400 and computing the distance of each interaction point 301, 302, 303 in that set from interaction points 310, 311, 312 in another set of interaction points 310, 311, 312 to be found in a neighbouring window 410. This data may then be filtered to obtain at least a subset of interaction points 301, 302, 303, 310, 311, 312 in each of the neighbouring windows 400, 410 that are spaced apart by a distance d1 that is less than or equal to the interaction threshold value dINT.TH. The efficiency of such an algorithm may be further improved by using information on the location of interaction points 301, 302, 303, 310, 311, 312 and, for example, ignoring all interaction points 301, 302, 303, 310, 311, 312 that are not located at a window boundary. An embodiment of the present invention is, of course, not limited to such an algorithm and other modifications thereto and/or suitable methods for improving data processing efficiency are considered to fall within the present scope.

An embodiment of the present invention is configurable to loop and repeat measurement of the distance d1 between interaction points 301, 302, 303, 310, 311, 312 as hereinbefore described, this being done at a given time in a user-specified time-frame. In this way, any changes in the dynamics of the windows 400, 410 may be accounted for. Such changes may, for example, be caused by the user such as, a change in window position due to being moved around by the user and/or status due to being closed and/or a new window being opened.

In response to the loop and repeat measurement yielding that the distance d1 between the interaction points 301, 302, 303, 310, 311, 312 of the respective interaction areas 200, 210 has changed and is now more than the interaction threshold value dINT.TH, then the active dynamic margin 500, 510 provided to each of the respective interaction areas 200, 210 is deactivated, that is, it is removed.

In response to the loop and repeat measurement yielding that the distance d1 between the interaction points 301, 302, 303, 310, 311, 312 of respective interaction areas 200, 210 is less than or equal to the interaction threshold value dINT.TH, then the active dynamic margins 500, 510 are retained, if such a result is obtained in respect of the same windows 400, 410 as those involved in the measurements conducted before the loop and repeat measurement, or provided to each of the respective interaction areas 200, 210 of new windows 400, 410 whose proximity has reduced to a value d1 that is up to the interaction threshold value dINT.TH.

Figure 2A:
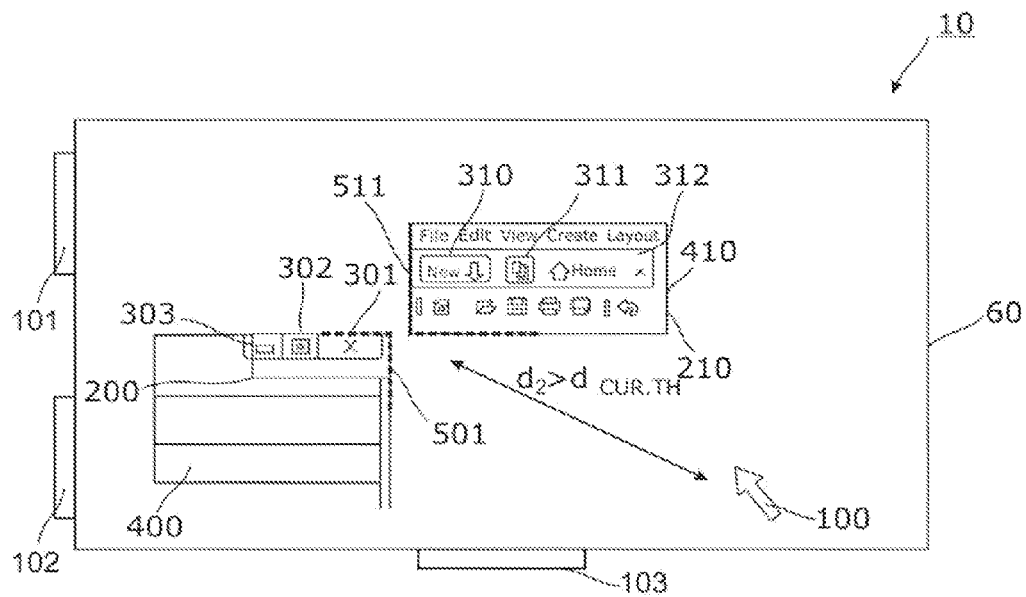
FIGS. 2a and 2b illustrate another principle of operation of an embodiment of the present invention.
Figure 2B:
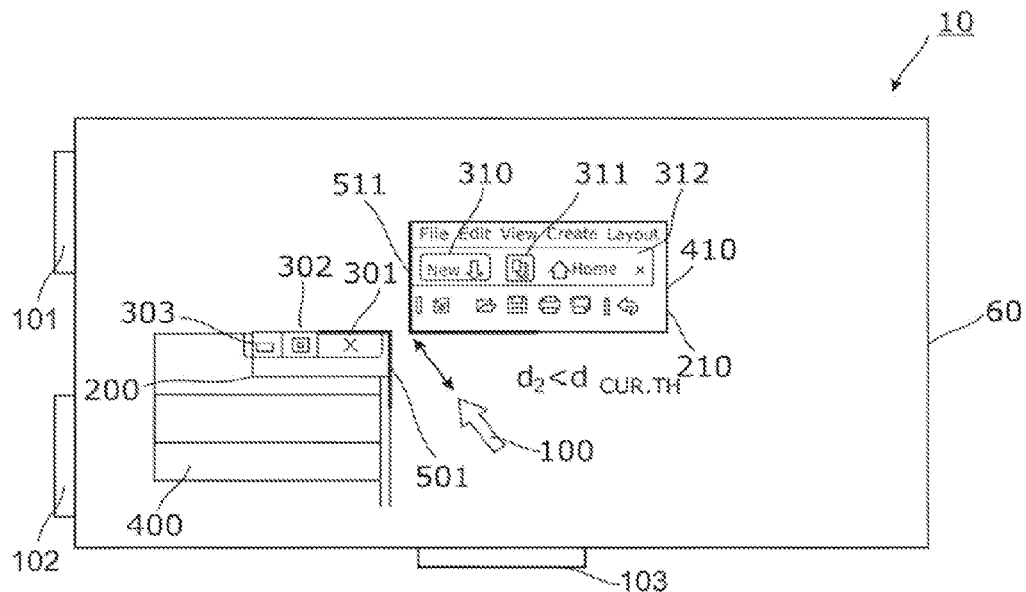

Reference is now made to FIGS. 2a and 2b, which schematically illustrate how a distance between the cursor 100 and neighbouring interaction areas 200, 210 can be used to control cursor motion. In this regard, a cursor distance d2 from at least one of the active dynamic margins 500, 510, provided as corner guards 501, 511 to the respective interaction areas 200, 210, as hereinbefore described with reference to FIGS. 1a and 1b, is measured. The measured cursor distance d2 is compared to a predetermined, cursor threshold value dCUR.TH, which gives an indication of a distance between the cursor 100 relative to at least two interaction areas 200, 210 that have been identified as being apart by a distance d1 that is less than or equal to the above-described interaction threshold value dINT.TH. Thus, the cursor threshold value dCUR.TH is used to control the cursor motion in a scenario where its movement between neighbouring interaction areas 200, 210 is linked to an increased probability of an undesirable action occurring, such as, overshooting into one of the interaction areas 200, 210 and inadvertently clicking on an icon/interaction point 301, 302, 303, 310, 311, 312 thereof.

In response to the cursor distance d2 being measured to be more than the cursor threshold value dCUR.TH, no further action in respect of a visibility status of the active dynamic margins 501, 511 needs to be taken. This is shown in FIG. 2a which shows the active dynamic margins 501, 511 being implemented as corner guards 501, 511 that are not visible to the user, as indicated by the dashed lines representing the corner guards 501, 511.

In response to the cursor distance d2 being measured to be any value up to the cursor threshold value dCUR.TH, the visibility of the active dynamic margins 501, 511 is activated as shown in FIG. 2b.

Figure 3A:
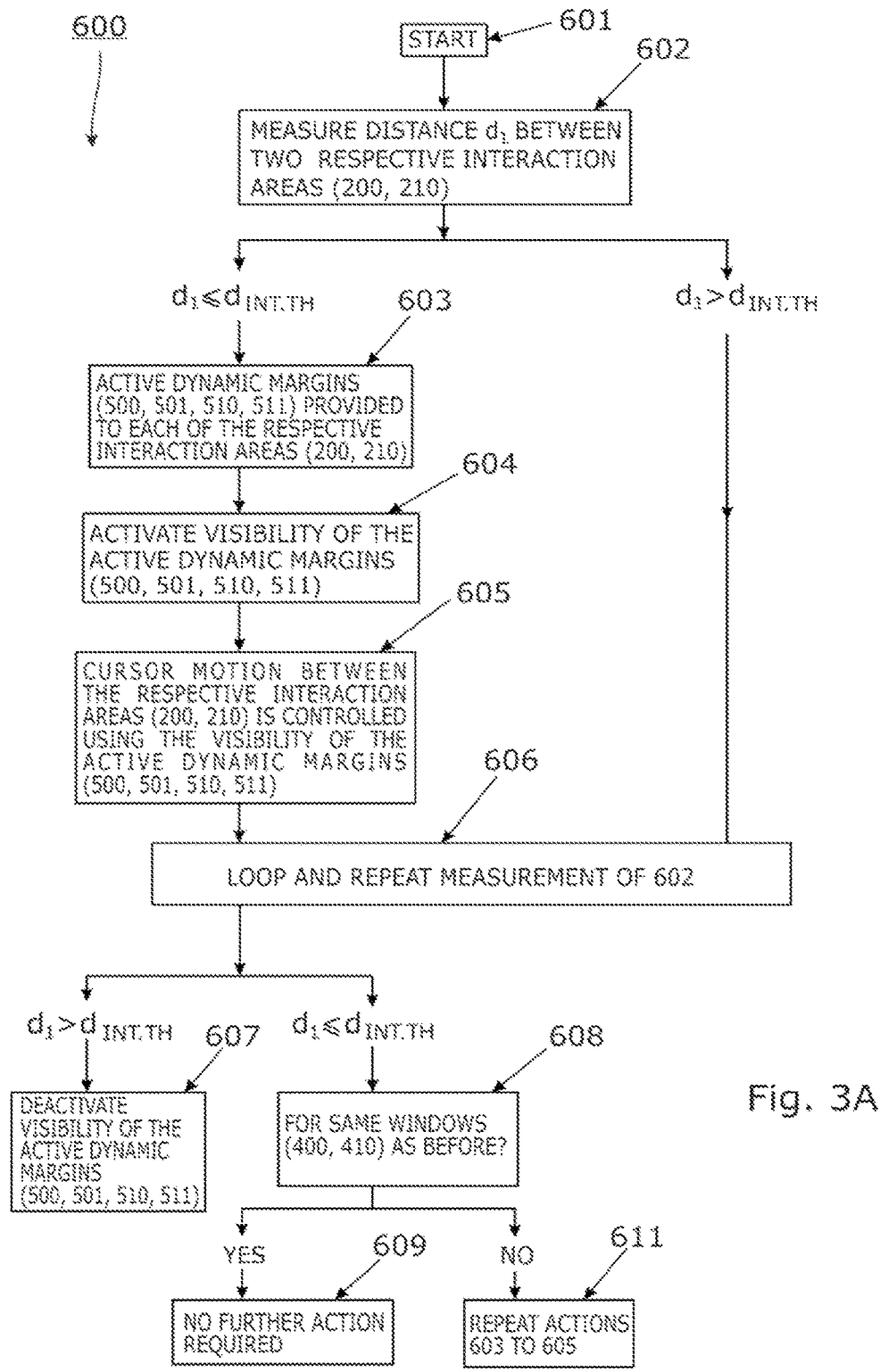
FIG. 3a is a flowchart of an embodiment of a method aspect of the present invention corresponding to the principle of operation illustrated by FIGS. 1a and 1b.

FIG. 3a is a flowchart of an embodiment of a method aspect of the present invention corresponding to the principle of operation illustrated by FIGS. 1a and 1b. The steps/measurements shown may be performed by the system 10 shown and described with reference to any one of FIGS. 1a and 1b but is not limited thereto and may be performed with any other suitable system and/or configuration.

An embodiment of a method aspect 600 of the present invention is started at block 601 and proceeds to block 602 where at least a distance d1 between the interaction points 301, 302, 303, 310, 311, 312 of at least a given pair of respective interaction areas 200, 210 is measured, whereby each of the interaction areas 200, 210 pertain to a different window 400, 410.

In response to the distance d1 being measured as a value above the predetermined interaction threshold value dINT.TH at block 602, which scenario is illustrated by FIG. 1a, no further action is taken until a measurement corresponding to block 606, described below, is performed.

In response to any value up to a predetermined, interaction threshold value dINT.TH being measured at block 602, at least an active dynamic margin 500, 510 is provided at block 603 to each of the interaction areas 200, 210 involved in the measurement prescribed at block 602. The active dynamic margin 500, 510 is provided substantially around the respective interaction areas 200, 210. In a preferred embodiment, the active margin 500, 510 is provided as at least a corner guard 501, 511 applied to a boundary of the interaction area 200, 210. At block 604, a visibility of each of the active dynamic margins 500, 501, 510, 511 provided to the respective interaction areas 200, 210 is activated. The visible active dynamic margins 500, 501, 510, 511 are used for controlling the cursor motion relative to the respective interaction areas 200, 210 at block 605, thereby reducing the possibility of undesirable and/or unintended interactions of the cursor 100 with any of the interaction points 301, 302, 303, 310, 311, 312 of the respective interaction areas 200, 210. No further action is then required until the measurement of block 606 is performed.

At block 606, the distance measurement step of block 602 is repeated after a predetermined time, either sequentially or non-sequentially, within a given time-frame. In an embodiment of the present invention, how this is done is user-modifiable.

In response to the distance between the interaction points 301, 302, 303, 310, 311, 312 of the respective interaction areas 200, 210 being measured as more than the interaction threshold value dINT.TH at block 606, the active dynamic margins 500, 501, 510, 511 provided to each of the respective interaction areas 200, 210 is deactivated, that is, it is removed. This is done at block 607.

In response to the measurement performed at block 606 yielding that the distance d1 between the interaction points 301, 302, 303, 310, 311, 312 of respective interaction areas 200, 210 is less than or equal to the interaction threshold value dINT.TH, then the active dynamic margins 500, 501, 510, 511: are retained and a no-further action stamp is recorded at block 609 if such a result is obtained in respect of the same windows 400, 410 as those involved in the measurements conducted from block 602 to block 605, or provided to each of the respective interaction areas 200, 210 of new windows 400, 410 whose proximity has reduced to a value d1 that is less than or equal to the interaction threshold value dINT.TH via block 611 in which the actions prescribed at blocks 603, 604 and 605 are performed in respect of the interaction areas 200, 210 of the new windows 400, 410.

Figure 3B:
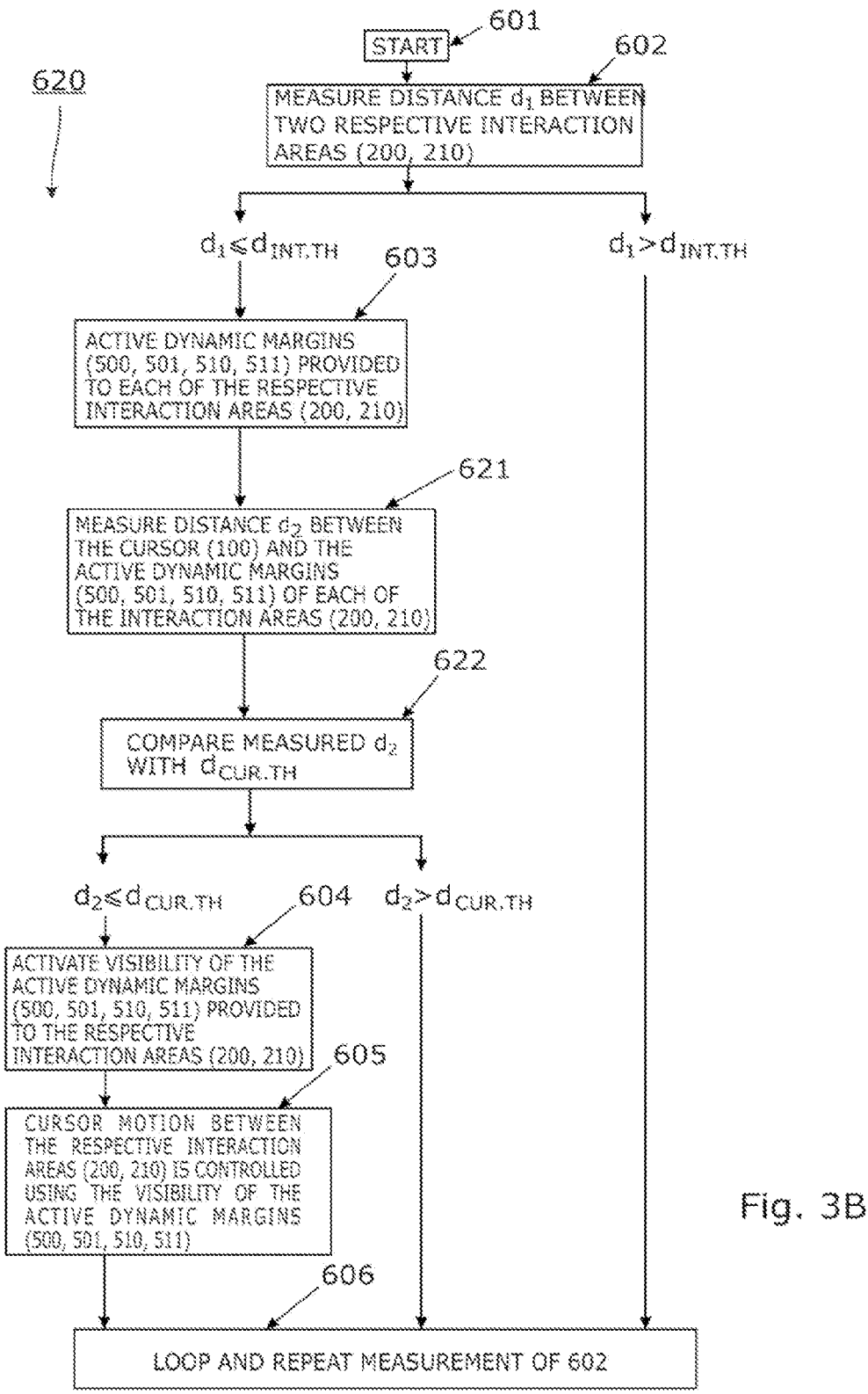
FIG. 3b is a flowchart of an embodiment of a method aspect of the present invention corresponding to the principle of operation illustrated by FIGS. 2a and 2b.

FIG. 3b is a flowchart of an embodiment of a method aspect of the present invention corresponding to the principle of operation illustrated by FIGS. 2a and 2b. It has several features/steps in common with the flowchart of FIG. 3a. The steps/measurements shown in FIG. 3b may be performed by the system 10 shown and described with reference to any one of FIGS. 1a, 1b, 2a and 2b but is not limited thereto and may be performed with any other suitable system and/or configuration.

An embodiment of a method aspect 620 of the present invention is started at block 601 and proceeds to block 602 where at least a distance d1 between the interaction points 301, 302, 303, 310, 311, 312 of at least a given pair of respective interaction areas 200, 210 is measured, whereby each of the interaction areas 200, 210 pertain to a different window 400, 410.

In response to the distance d1 being measured as a value above the predetermined interaction threshold value dINT.TH at block 602, no further action is taken until the earlier-described measurement of block 606 is performed.

In response to any value up to a predetermined, interaction threshold value dINT.TH being measured at block 602, at least an active dynamic margin 500, 501, 510, 511 is provided at block 603 to each of the interaction areas 200, 210 involved in the measurement prescribed at block 602.

At block 621, a cursor distance d2 from at least one of the active margins 500, 501, 510, 511, which is provided to the respective interaction areas 200, 210 at block 603 is measured.

At block 622, the cursor distance d2 measured at block 621 is compared to the predetermined, cursor threshold value dCUR.TH, which has already been described with reference to FIG. 2b.

In response to the cursor distance d2 being determined to be any value up to the cursor threshold value dCUR.TH at block 622, the visibility of the active dynamic margins 500, 501, 510, 511 is activated at block 604. The visible active dynamic margins 500, 501, 510, 511 are used for controlling the cursor motion relative to the respective interaction areas 200, 210 at block 605, thereby reducing the possibility of undesirable and/or unintended interactions of the cursor 100 with any of the interaction points 301, 302, 303, 310, 311, 312 of the respective interaction areas 200, 210. No further action is then required until the measurement of block 606, described earlier, is performed.

In response to the cursor distance d2 being determined to be greater than the cursor threshold value dCUR.TH at block 622, no further action in respect of at least a visibility status of the active dynamic margins 500, 501, 510, 511 needs to be taken. The next action to be taken would be to perform the measurement of block 606.

In the present embodiment, the measurement prescribed at block 606 may be user-configurable to occur at different times after the measurement done at block 602 yields a d1>dINT.TH reading and from when it is performed after the measurements subsequent to block 622.

A feature of an embodiment of the present invention is that it is applicable to overlapping windows 400, 410 and all visible interaction points 301, 302, 303, 310, 311, 312 thereof. A further feature is that a given interaction area 200, 210 may be selected to comprise a given set of interaction points 301, 302, 303, 310, 311, 312. Such a set may be a subset from the superset of all interaction points 301, 302, 303, 310, 311, 312 of an interaction area 200, 210. It may be user-modifiable to facilitate protection of interaction points 301, 302, 303, 310, 311, 312 corresponding to specific functions, such as, for example, the functions, "close/minimise", but not "maximise".

An embodiment of the present invention has been described hereinbefore with respect to the display of two windows 400, 410 on a computer monitor 60. However, this is purely by way of example, and application of an embodiment of the present invention is not limited thereto and extends to the scenario of multiple windows being displayed on the computer monitor 60.

An embodiment of the present invention is applicable for cursor control on multiple monitors. In this regard, the multiple monitors may be considered to encapsulate a single canvas upon which all items may be displayed, for example, via respective windows and/or panels. An embodiment of the present invention would be operable such that the corner guards 501, 511 would be applied upon each window/panel/interaction item on the complete canvas and then this would be applied across the multiple monitors.

The present invention may be a system, a method and/or a computer program product at any possible technical level of integration. The computer program product may include a computer readable storage medium (or media) having computer readable program instructions thereon for causing a processor to carry out the aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable storage instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages including an object oriented program language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Features of an embodiment of one aspect of the present invention may be applied to any other aspect and vice versa.

In any of the above aspects, the various features may be implemented in hardware or as software modules running on one or more data processors.

The invention claimed is:

1. A computer-implemented method for controlling a motion of a cursor relative to first and second graphically-displayed windows on a screen of a computer system, the method comprising:
   measuring a first distance by the computer system, wherein the first window has a first interaction area containing a first interaction point icon, wherein the first interaction point icon has an associated first operation and responds to selection and activation of the cursor by causing execution of the first operation, wherein the second window has a second interaction area containing a second interaction point icon, wherein the second interaction point icon has an associated second operation and responds to selection and activation by the cursor by causing execution of the second operation, and wherein the first distance is a distance between the first and second interaction points;
   providing, by the computer system, a first dynamic margin, substantially surrounding the first interaction area and extending beyond the first window and a second dynamic margin substantially surrounding the second interaction area and extending beyond the second window;
   activating the dynamic margins in response to the first distance being less than a predetermined, interaction threshold distance; and
   controlling the cursor motion relative to the respective interaction areas by the computer system using the provided active dynamic margins for guidance.

2. A method as claimed in claim 1 comprising:
   causing, by the computer system, the dynamic margins to become visible when the dynamic margins are activated.

3. A method as claimed in claim 1 further comprising:
   selecting each of the respective interaction areas to comprise at least a modifiable set of interaction points.

4. A method as claimed in claim 1, comprising:
   repeating the measuring of the first distance; and
   deactivating the dynamic margins in response to the repeated measuring indicating that the first distance is more than the interaction threshold distance.

5. A method as claimed in claim 1 further comprising:
   measuring a second distance from the cursor to the first dynamic margin and a third distance from the cursor to the second dynamic margin; and
   comparing the second and third distances to a predetermined, cursor threshold distance, wherein the activating the dynamic margins is also in response to at least one of the measured second and third distances being less than the cursor threshold distance, such that the dynamic margins are not activated unless the first distance is less than the interaction threshold distance and at least one of the second and third distances is less than the cursor threshold distance.

6. A system for controlling motion of a cursor relative to first and second graphically-displayed windows on a screen of a computer system, the method comprising:
   a memory configurable to store executable instructions; and
   a data processor operatively coupled to the memory, the data processor being configurable to execute the instructions stored in the memory, thereby to:
   measure a first distance, wherein the first window has a first interaction area containing a first interaction point icon, wherein the first interaction point icon has an associated first operation and responds to selection and activation of the cursor by causing execution of the first operation, wherein the second window has a second interaction area containing a second interaction point icon, wherein the second interaction point icon has an associated second operation and responds to selection and activation by the cursor by causing execution of the second operation, and wherein the first distance is a distance between the first and second interaction points;
   provide a first dynamic margin substantially surrounding the first interaction area and extending beyond the first window and a second dynamic margin substantially surrounding the second interaction area and extending beyond the second window;
   activating the dynamic margins in response to the first distance being less than a predetermined, interaction threshold distance; and
   cause the cursor motion to be controlled relative to the respective interaction areas using the provided active dynamic margins for guidance.

7. A system as claimed in claim 6 wherein the memory stores instructions that, when executed by the processor, cause the dynamic margins to become visible when the dynamic margins are activated.

8. A system as claimed in claim 6 wherein the memory stores instructions that, when executed by the processor, cause each of the respective interaction areas to be selected to comprise at least a modifiable set of interaction points.

9. A system as claimed in claim 6 wherein the memory stores instructions that, when executed by the processor, causes repeating the measuring of the first distance and
   deactivating the dynamic margins in response to the repeated measuring indicating that the first distance is more than the interaction threshold distance.

10. A system as claimed in claim 6 wherein the memory stores instructions that, when executed by the processor, causes measuring a second distance from the cursor to the first dynamic margin and a third distance from the cursor to the second dynamic margin; and
   comparing the second and third distances to a predetermined, cursor threshold distance, wherein the activating the dynamic margins is also in response to at least one of the second and third distances being less than the cursor threshold distance, such that the dynamic margins are not activated unless the first distance is less than the interaction threshold distance and at least one of the second and third distances is less than the cursor threshold distance.

11. A computer program product for controlling motion of a cursor relative to first and second graphically-displayed windows on a monitor of a computer system, the computer program product comprising a computer-readable storage medium having program instructions embodied therewith, the program instructions executable by a computer to perform operations comprising:
   measuring a first distance, wherein the first window has a first interaction area containing a first interaction point icon, wherein the first interaction point icon has an associated first operation and responds to selection and activation of the cursor by causing execution of the first operation, wherein the second window has a second interaction area containing a second interaction point icon, wherein the second interaction point icon has an associated second operation and responds to selection and activation by the cursor by causing execution of the second operation, and wherein the first distance is a distance between the first and second interaction points;
   providing a first dynamic margin substantially surrounding the first interaction area and extending beyond the first window and a second dynamic margin substantially surrounding the second interaction area and extending beyond the second window;
   activating the dynamic margins in response to the first distance being less than a predetermined, interaction threshold distance; and
   controlling the cursor motion relative to the respective interaction areas using the provided active dynamic margins for guidance.

12. A computer-program product as claimed in claim 11 comprising program instructions executable by a computer to perform operations comprising:
   causing the dynamic margins to become visible when the dynamic margins are activated.

13. A computer-program product as claimed in claim 11 comprising program instructions executable by a computer to perform operations comprising:
   repeating the measuring of the first distance; and
   deactivating the dynamic margins in response to the repeated measuring indicating that the first distance is more than the interaction threshold distance.

14. A computer-program product as claimed in claim 11 comprising program instructions executable by a computer to perform operations comprising:
   measuring a second distance from the cursor to the first dynamic margin and a third distance from the cursor to the second dynamic margin; and
   comparing the second and third distances to a predetermined, cursor threshold distance, wherein the activating the active dynamic margins is also in response to at least one of the measured distances being less than the cursor threshold distance, such that the dynamic margins are not activated unless the first distance is less than the interaction threshold distance and at least one of the second and third distances is less than the cursor threshold distance.

* * * * *